(12) United States Patent
Bye et al.

(10) Patent No.: US 11,930,374 B2
(45) Date of Patent: Mar. 12, 2024

(54) DYNAMIC CELLULAR NETWORK SPECTRUM SHARING

(71) Applicant: DISH Wireless L.L.C., Englewood, CO (US)

(72) Inventors: Stephen Bye, Littleton, CO (US); Craig Sparks, Highlands Ranch, CO (US); Marc Rouanne, Cherry Hills Village, CO (US); Jeremy Capell, Lone Tree, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/299,529

(22) Filed: Apr. 12, 2023

(65) Prior Publication Data

US 2023/0254704 A1 Aug. 10, 2023

Related U.S. Application Data

(63) Continuation of application No. 17/192,182, filed on Mar. 4, 2021, now Pat. No. 11,665,549.
(Continued)

(51) Int. Cl.
*H04W 16/14* (2009.01)
*H04L 5/00* (2006.01)
(Continued)

(52) U.S. Cl.
CPC .......... *H04W 16/14* (2013.01); *H04L 5/0098* (2013.01); *H04W 12/02* (2013.01);
(Continued)

(58) Field of Classification Search
CPC .................................................... H04W 16/14
See application file for complete search history.

(56) References Cited

U.S. PATENT DOCUMENTS

| 10,631,358 B1* | 4/2020 | Fang ............... H04W 76/27 |
| 11,743,737 B2* | 8/2023 | Bhaskaran ....... H04W 72/29 |
| | | 370/329 |

(Continued)

FOREIGN PATENT DOCUMENTS

| CN | 108 366 369 A | 8/2018 |
| GB | 2492796 A | 1/2013 |
| WO | 2018022629 A1 | 2/2018 |

OTHER PUBLICATIONS

International Search Report and Written Opinion for PCT/US2021/056148 dated Jul. 7, 2022, all pages.

(Continued)

*Primary Examiner* — Jamaal Henson
(74) *Attorney, Agent, or Firm* — Kilpatrick Townsend & Stockton LLP

(57) ABSTRACT

Various arrangements for allocating spectrum between a cellular network provider and a secondary operator are presented. A cellular network component of the secondary operator may determine that spectrum at a secondary operator radio unit (RU) is not currently needed. The cellular network component of the secondary operator may cause the spectrum to be released for use by a cellular network operator such that the secondary operator RU is not permitted to use the released spectrum. A cellular network operator RU may then communicate with a first set of user equipment (UE) using the released spectrum. The secondary operator RU and cellular network operator RU may be located at a same location.

20 Claims, 6 Drawing Sheets

Related U.S. Application Data

(60) Provisional application No. 63/104,981, filed on Oct. 23, 2020.

(51) Int. Cl.
*H04W 12/02* (2009.01)
*H04W 12/033* (2021.01)
*H04W 12/102* (2021.01)
*H04W 76/30* (2018.01)

(52) U.S. Cl.
CPC ....... *H04W 12/033* (2021.01); *H04W 12/102* (2021.01); *H04W 76/30* (2018.02)

(56) References Cited

U.S. PATENT DOCUMENTS

| | | |
|---|---|---|
| 2008/0130519 A1 | 6/2008 | Bahl et al. |
| 2011/0014936 A1 | 1/2011 | Kim |
| 2013/0190003 A1 | 7/2013 | Smith et al. |
| 2013/0272219 A1 | 10/2013 | Singh et al. |
| 2015/0172896 A1 | 6/2015 | Van Phan et al. |
| 2015/0304852 A1* | 10/2015 | El-Refaey ............. H04W 16/14 455/509 |
| 2016/0127913 A1 | 5/2016 | Li et al. |
| 2016/0373935 A1* | 12/2016 | Smith ............... H04W 36/0016 |
| 2017/0366575 A1* | 12/2017 | Polepalli ............. H04L 63/1458 |
| 2019/0007899 A1* | 1/2019 | Vrzic ..................... H04W 8/02 |
| 2019/0166605 A1 | 5/2019 | Yang et al. |
| 2019/0223055 A1 | 7/2019 | Bor Yaliniz et al. |
| 2019/0246335 A1 | 8/2019 | Mukherjee |
| 2019/0372853 A1 | 12/2019 | Bainbridge et al. |
| 2020/0100137 A1* | 3/2020 | Panchal ................ H04W 48/18 |
| 2020/0145818 A1* | 5/2020 | Lee ..................... H04W 12/037 |
| 2020/0195495 A1* | 6/2020 | Parker ..................... H04L 41/40 |
| 2020/0296696 A1* | 9/2020 | Goldhamer ............ H04W 4/40 |
| 2021/0045011 A1* | 2/2021 | Mishra ................. H04B 1/0003 |
| 2021/0112565 A1* | 4/2021 | Bhaskaran ............. H04W 8/18 |
| 2021/0182658 A1* | 6/2021 | Wang ..................... G06N 3/02 |

OTHER PUBLICATIONS

International Search Report and Written Opinion for PCT/US2021/056149 dated Jun. 21, 2022, all pages.

* cited by examiner

DYNAMIC CELLULAR NETWORK SPECTRUM SHARING

CROSS-REFERENCE TO RELATED APPLICATIONS

This application is a continuation of U.S. patent application Ser. No. 17/192,182, filed on Mar. 4, 2021, entitled "Dynamic Cellular Network Spectrum Sharing," which claims priority to U.S. Provisional Patent Application No. 63/104,981, filed on Oct. 23, 2020, entitled "Dynamic Spectrum Sharing," the disclosure of which are hereby incorporated by reference in their entirety for all purposes.

This application is related to U.S. patent application Ser. No. 17/192,176, filed on Mar. 4, 2021, entitled "Secondary Operator Integration with a Cellular Core Network," the disclosure of which is hereby incorporated by reference in its entirety for all purposes.

BACKGROUND

On 4G Long Term Evolution (LTE) cellular networks and earlier generation cellular networks, allocating a defined amount of network resources to particular entities or groups of user equipment was difficult. However, with later-generation cellular networks, such as 5G New Radio (NR) cellular networks, network slices may be defined. A network slice can effectively function as a virtual network that has its own logical topology, security rules, and performance characteristics that function within the limits of the underlying physical network.

SUMMARY

Various embodiments are described related to a method for allocating spectrum between a cellular network provider and a secondary operator. In some embodiments, a method for allocating spectrum between a cellular network provider and a secondary operator is described. The method may comprise determining, by a component of the secondary operator, that spectrum at a secondary operator radio unit (RU) may not be currently needed. The secondary operator RU may be connected with a cellular network of the cellular network provider. The method may comprise releasing, by the component of the secondary operator, the spectrum for use by a cellular network operator such that the secondary operator RU may not be permitted to use the released spectrum. The method may comprise communicating, by a cellular network operator RU, with a first set of user equipment (UE) using the released spectrum. The secondary operator RU and cellular network operator RU may be at a same location. The cellular network operator RU may be connected with the cellular network of the cellular network provider. The cellular network may route communications from the secondary operator RU to a secondary operator network distinct from the cellular network. The method may comprise reclaiming, by the component of the secondary operator, the spectrum such that the cellular network operator may not be permitted to use the reclaimed spectrum. The method may comprise communicating, by the secondary operator RU, with a second set of UE using the reclaimed spectrum.

Embodiments of such a method may include one or more of the following features: releasing the spectrum for use by the cellular network operator may comprise the secondary operator RU activating a first bandwidth part (BWP) definition at the second set of UE that excludes use of the spectrum. Reclaiming the spectrum for use by the cellular network operator may comprise the secondary operator RU activating a second BWP definition at the second set of UE that includes use of at least part of the spectrum. The method may further comprise processing communications of the secondary operator RU using a data center operated by the secondary operator. The data center may be distinct from the cellular network of the cellular network provider. Communicating with the second set of UE using the reclaimed spectrum may comprise the secondary operator RU routing communications to the data center via a distributed unit (DU) that may be in communication with the cellular network operator RU and the secondary operator RU. The DU may be operated by the cellular network operator. The cellular network RU may communicate with the DU as part of a first cellular network slice and the secondary operator RU communicates with the DU as part of a second cellular network slice. The cellular network may be a 5G New Radio (NR) cellular network. Determining that the spectrum at the secondary operator RU may not be currently needed may be based on comparing a first amount of spectrum usage to a first threshold value over a first defined period of time. The method may further comprise determining that the spectrum at the secondary operator RU may be needed based on comparing a second amount of spectrum usage to a second threshold value over a second defined period of time. After the spectrum may be released but before the spectrum may be reclaimed, the spectrum may continue to be used by another secondary operator RU in another geographic region. The secondary operator RU and the cellular network operator RU may be attached with a same tower.

In some embodiments, a cellular network system is described. The system may comprise a cellular network operated by a cellular network provider. The system may comprise a secondary operator radio unit (RU) operated by a secondary operator. The system may comprise a secondary operator network, in communication with the cellular network operated by the cellular network provider. The network may be configured to determine that spectrum allocated to the secondary operator RU may not be currently needed. The network may be configured to release the spectrum for use by the cellular network operator such that the secondary operator RU may not be permitted to use the released spectrum. The network may be configured to, at a time after releasing the spectrum, reclaim the spectrum such that the cellular network operator may not be permitted to use the reclaimed spectrum. The network may be configured to communicate with a second set of UE using the reclaimed spectrum. The system may comprise a cellular network operator RU, configured to communicate with a first set of user equipment (UE) using the released spectrum. The secondary operator RU and cellular network operator RU may be at a same location. The secondary operator RU and the cellular network operator RU each may communicate with the cellular network of the cellular network provider. The cellular network may route communications from the secondary operator RU to the secondary operator network.

Embodiments of such a method may include one or more of the following features: the secondary operator network being configured to release the spectrum for use by the cellular network operator may comprise the secondary operator RU being configured to activate a first bandwidth part (BWP) definition at the second set of UE that excludes use of the spectrum. The secondary operator network being configured to reclaim the spectrum for use by the cellular network operator may comprise the secondary operator RU being configured to activate a second BWP definition at the second set of UE that includes use of at least part of the spectrum. The secondary operator network may be further configured to process communications of the secondary operator RU using a data center operated by the secondary operator. The data center may be distinct from the cellular network of the cellular network provider. Communicating with the second set of UE using the reclaimed spectrum may comprise the secondary operator RU routing communications to the data center via a distributed unit (DU) that may be in communication with cellular network operator RU and the secondary operator RU. The DU may be operated by the cellular network operator. The cellular network RU may communicate with the DU as part of a first cellular network slice and the secondary operator RU may communicate with the DU as part of a second cellular network slice. The cellular network may comprise a 5G New Radio (NR) cellular core network. After the spectrum may be released but before the spectrum may be reclaimed, the spectrum may continue to be used by another secondary operator RU in another geographic region. The secondary operator RU and the cellular network operator RU may be attached with a same cellular tower.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
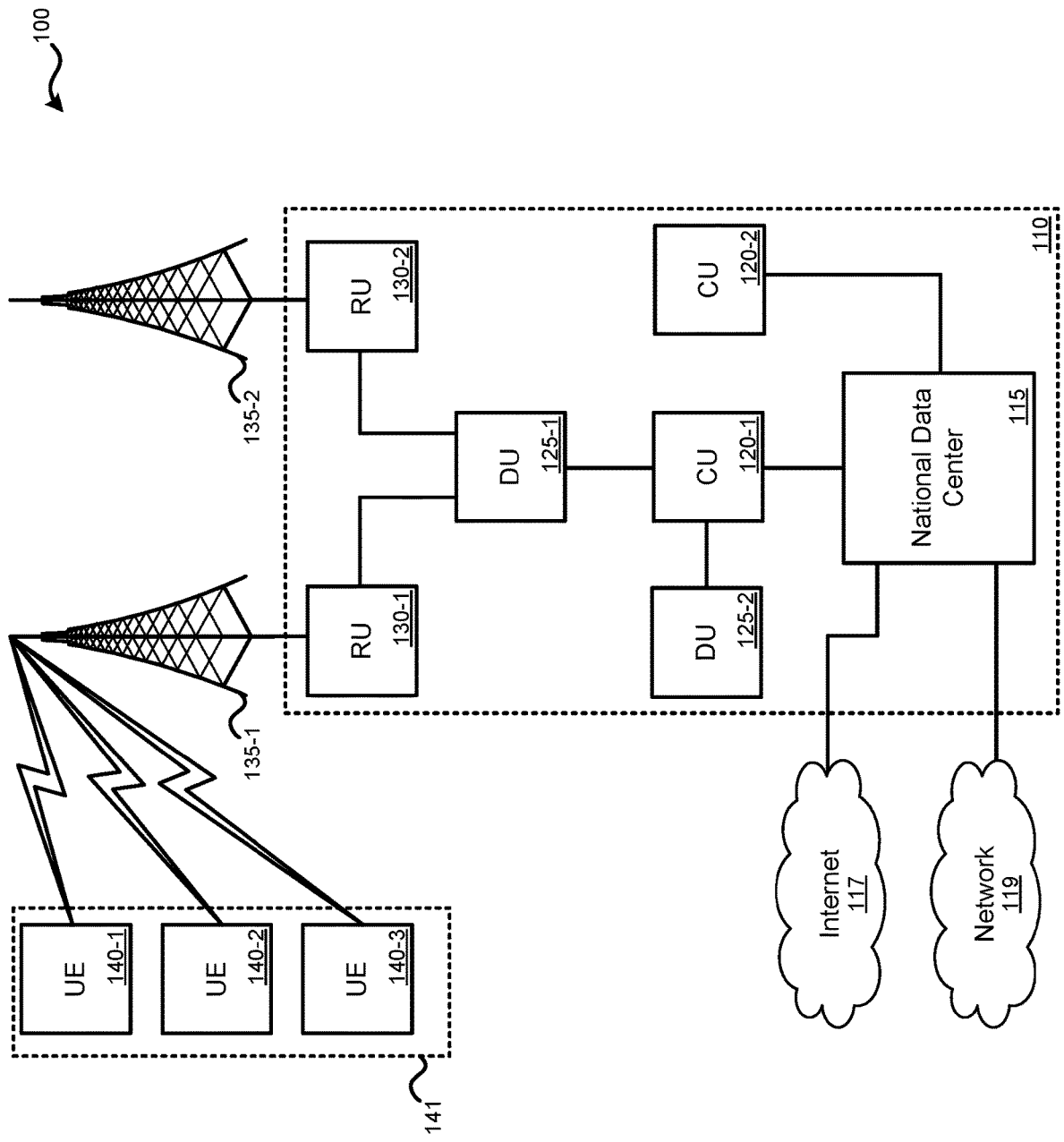
FIG. 1 illustrates a block diagram of an embodiment of a cellular network.

Using cellular network slicing, a secondary operator, which is distinct from the network operator of the cellular network, can have autonomy to control a defined cellular network slice. As detailed herein, a secondary operator can use a dedicated radio unit (RU) that communicates via components of the network operator's cellular network in order to communicate with the secondary operator's network. Such an arrangement can allow the secondary operator autonomy to effectively operate a (virtual) cellular network without having to fully build out its own cellular network.

By using a dedicated RU, the secondary operator is afforded significant autonomy on how the secondary operator operates its network slice. As one possible example, the dedicated RU can perform upstream (from UE to the cellular network) payload encryption and/or downstream (from the cellular network to the UE) decryption. When communications are routed to the secondary operator's network and the secondary operator's RU via the cellular network, the communications may remain encrypted except to the extent needed for data routing. Therefore, none of the data of the secondary operator may be exposed on the cellular network or to the operator of the cellular network. Further, the cellular network does not even need to be aware of the type of encryption or scrambling used on the secondary operator's payloads because encryption and decryption are handled by the secondary operator's network and either the secondary operator's RUs or UE.

Such an arrangement can be particularly useful for a secondary operator requiring a high level of security or privacy. As an example, the military may desire to have its own virtual cellular network without having to build out a complete cellular network. The military, in areas where desired, could install RUs that use various components, as detailed herein, of a commercial operator's cellular network. The military could have a defined cellular network slice for which communications performed using the cellular network slice are routed between the military's network by the cellular network and the military's RU. The military's network could fully manage prioritization of UE, bandwidth allocation of UE, cellular services provided, encryption, and UE configuration within the military's dedicated cellular network slice.

In some embodiments, an RU operated by a secondary operator may be used in conjunction with two (or more) cellular network slices. Depending on the particular cellular network slice being used for communication with a UE, the cellular network of the cellular network operator may route the data differently to the secondary operator's network. The secondary operator may further be permitted to manage its UE as to which cellular network slice the UE is assigned. For example, one cellular network slice may be used for ultra-secure communications, while a second cellular network slice is used for relatively less secure communications. Additionally or alternatively, the UE could connect to a cellular network slice operated by the cellular network operator. The instruction to use this cellular network slice may be made by an operator of the UE or a command may be sent to the UE by the secondary operator's network.

In some situations, the secondary operator may not need to use all of the spectrum and/or bandwidth of the cellular network slice allocated to the secondary operator for a given geographical region at a particular time. The secondary operator may temporarily release resources, such as spectrum, bandwidth, and/or processing resources, for permissible use by another cellular network slice. For example, a secondary operator may have the rights to particular spectrum for a given region. When the secondary operator does not need the spectrum, the secondary operator's network may send an instruction to the cellular network of the cellular network operator that indicates that the spectrum is at least temporarily available for use. While available, the cellular network operator may alter bandwidth part (BWP) definitions (or the active BWP definitions) used for a cellular network slice it operates to take advantage of the spectrum available from the secondary operator. When the secondary operator reclaims the spectrum, the cellular network operator may again alter BWP definitions or the active BWP profile for UE such that the spectrum is again reserved for the secondary operator. Such an arrangement call allows for a secondary operator to maintain the ability to use its reserved spectrum and/or bandwidth, but allows the spectrum and/or bandwidth to be used by another operator when it is not needed by the secondary operator.

Further detail regarding these and other embodiments are presented in relation to the figures. FIG. 1 illustrates a block diagram of an embodiment of a cellular network system 100. Cellular network system 100 can be operated by a cellular network operator (also referred to as a cellular network provider). The cellular network operator may be a commercial entity that allows subscribers to access the cellular network using UE in exchange for a subscription or on a fixed-fee basis. Cellular network 110 can include both a cellular access network and a cellular core network. Cellular network 110 can include: national data center (NDC) 115; central units (CUs) 120; distributed units (DUs) 125; and radio units (RUs) 130. The cellular access network can be defined as including the RUs 130, DUs, 125, and CUs 120. The cellular core network can be defined as including NDC 115. The Cellular network 110 can represent a 5G New Radio (NR) cellular network or, more specifically, a "standalone" 5G cellular network. Therefore, the cellular core network can be a 5G core (5GC) network. Cellular network 110 may operate according to the Open Radio Access Network (O-RAN) cloud-native architecture that allows for mobile front-haul, mid-haul, and back-haul to be performed using cloud-computing principles. Therefore, rather than using specialized hardware to perform access network and core network functionality, more generalized purpose server systems operating specialized software or firmware are used to perform the functions of cellular network 110. Additionally or alternatively, cellular network 110 may be native 5G in accordance with 3GPP 5G standards.

An RU, such as RU 130-1, serves as the interface between cellular network 110 and wireless radio-based communications with UE 140. RU 130-1 handles transmitting and receiving wireless communications with UE 140 via one or more antennas located on tower 135-1. RU 130-1 can be located on or nearby tower 135-1. RU 130-1 handles transmitting and receiving data according to a particular wireless communication protocol, such as 3G, 4G LTE, 5G NR, or some future technology, such as 6G or beyond. As illustrated in FIG. 1, RU 130-1 is connected with one or more antennas located on tower 135-1 and currently communicates with UE 140. Cellular network traffic for UE 140 may occur on a particular cellular network slice between RU 130-1 and DU 125-1. RU 130-2 communicates with other UE via one or more antennas on tower 135-2. In some embodiments, structures other than towers, such as buildings and bridges, may be used for mounting antennas. Group 141 indicates that UE 140 communicate using a single cellular network slice on cellular network 110.

Multiple RUs may communicate with a single DU, such as DU 125-1. A DU, such as DU 125-1, functions as a logical node of the cellular network between RUs and a CU, such as CU 120-1. DU 125-1 can perform various functions, which may be customized based on the specific cellular network. For example, DU 125-1 may operate the Radio Link Control (RLC) layer, Medium Access Control (MAC) layer, and aspects of the physical (PHY) layer in conjunction with the connected DUs and CU. DU 125-2 may also communicate with CU 120-1. Notably, the multiple RUs that communicate with a single DU may be made by different manufacturers. Since the cellular network operates according to O-RAN, the cellular network can tolerate different make/model of RUs; therefore, the secondary operator is not restricted to using a particular make/model of RU.

CU 120-1 may serve to operate different layers than DUs 125. Again, the specific functions and layers handed by CUs 120 can be customized based on the specific cellular network. For example, CUs 120 may operate the Radio Resource Control (RRC) layer and Packet Data Convergence Protocol (PDCP) layers. Viewed another way, a gNodeB can include a CU and at least one DU. A CU can also be referred to as a local data center of cellular network 110. In the hierarchy of a cellular network, a CU may sit between DUs 125 and a national or centralized data center. RUs 130, DUs 125, and CUs, 120 may be connected using high-speed fiber optic communications.

CUs 120 may communicate with NDC 115 of cellular network 110. Depending on the architecture of cellular network 110, various other networks, such as the Internet 117 and/or network 119, which may be some other public or private network, may be accessed via NDC 115. In other embodiments, such networks may be accessible via CUs 120 and/or DUs 125.

UE 140 can represent various forms of devices that can communicate using the cellular network. For example, smartphones, cellular modems, wireless sensor devices, access points (APs) and gaming devices may function as UE 140. Collectively, UE 140 may be assigned to a particular cellular network slice. Therefore, front haul (data transmission between RUs 130 and DU 125), midhaul (data transmission between DU 125 and CU 120) and backhaul (data transmission between CU 120 and NDC 115) may be performed by cellular network 110 using the cellular network slice to which UE 140 are assigned. If any other cellular network slice is present, those physical resources may be reserved for UE associated with the other cellular network slice.

FIG. 1 illustrates a simplified embodiment of a cellular network. It should be understood that in practice a significantly more expansive network can be present with a greater number of towers, RUs 130, DUs 125, and CUs 120. The cellular network can be a native 5G NR cellular network that uses both 5G NR for communication with UE and for cellular network 110. However, other cellular technologies may be possible.

Figure 2:
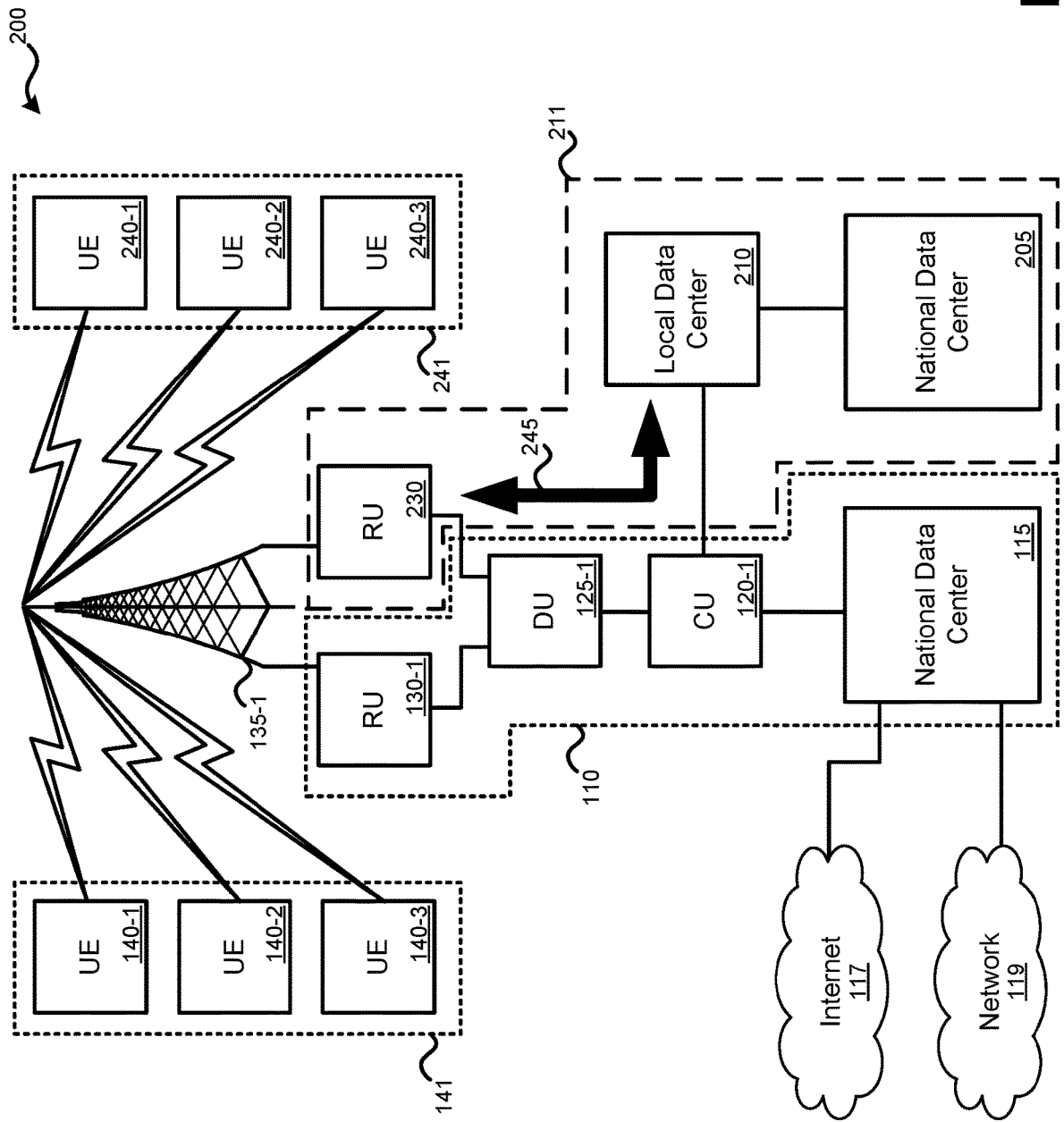
FIG. 2 illustrates a block diagram of an embodiment of a cellular network with advanced secondary operator control.

While FIG. 1 illustrates a cellular network operated by a single cellular network operator, FIG. 2 illustrates a secondary operator that relies on the cellular network operator's access and/or core network for at least some functionality and communication. FIG. 2 illustrates a block diagram of an embodiment of a cellular network 200 with advanced secondary operator control. Cellular network 200 is an embodiment of cellular network system 100 on which a secondary operator is assigned a cellular network slice on the cellular network.

On cellular network 200, a secondary operator maintains its own RU 230 and other network components as part of secondary operator network 211, such as local data center (LDC) 210 and national data center (NDC) 205. Notably, the secondary operator does not operate all components necessary to operate an independent cellular network. In the illustrated embodiment of FIG. 2, the secondary operator does not operate its own DUs or CUs.

While the secondary operator does not operate its own DUs or CUs in the embodiment illustrated in FIG. 2, the secondary operator maintains full operational control of LDC 210, NDC 205, and RU 230, which are parts of secondary operator network 211. By having control of its own RU 230, the secondary operator has control over UE prioritization, radio access technology (RAT), bandwidth allocations, BWP definitions on its spectrum, encryption of data, and more, as discussed below.

LDC 210 of the secondary operator may communicate (e.g., via a fiber optic link) with a component of the cellular network operator's cellular network. To be clear, the secondary operator and the cellular network operator are distinct entities. For example, the cellular network operator may be a commercial entity and the secondary operator may be a separate commercial entity (e.g., a casino) or a governmental entity (e.g., the military). In the embodiment of FIG. 2, LDC 210 communicates with CU 120-1. The secondary operator has a designated cellular network slice on cellular network 110. Therefore, a particular amount of physical communication and processing resources of cellular network 110 may be reserved for the secondary operator. The secondary operator can collate, manage, interpret operational and security logs on its designated network slice. By the secondary operator having a designated network slice, advanced analysis on its communication traffic may be performed, including artificial intelligence (AI)—bases analyses, including behavioral pattern analyses. On the secondary operator's cellular network slice, the secondary operator can perform various security controls particular to the secondary operator including, but not limited to: UE protection; denial of service (DoS) protection; identify and access management; behavioral anomaly detection; endpoint protection; certification lifecycle management; firewalls/gateways; container security; zero trust architecture; mutual authentication; management of network function communications; and integrated security incident and event management platforms.

RU 230 may be installed, maintained, and/or configured by the secondary operator. RU 230 may be installed on a same tower or structure as RU 130-1 or on a different tower or structure. RU 230 may be capable of communicating on different frequencies than RU 130-1. In some embodiments, at least some of the frequencies that RU 230 uses for communication with UE are the same as frequencies on which RU 130-1 can communication with UE 140. RU 230 communicates with UE 240 that are associated with the secondary operator. The secondary operator, via RU 230 and LDC 210, has full operational control on authentication of UE 240 for accessing the network of the secondary operator.

Via RU 230, NDC 205 and/or LDC 210 of the secondary operator can be used to configure characteristics of how communications with UE 240 are handled. Specifically, the secondary operator can control the priority of each of UE 240, the amount of bandwidth allocated to each of UE 240, and/or the cellular services provided to each of UE 240. The secondary operator can control and optimize the use of the radio resources allocated to UE 240 based on the services supported and optimized for each application enabled by the secondary operator. The optimization can take into account any number of variables, including but limited to the application performance, the time of day, and the geographic location of UE 240.

Notably, RU 230 of the secondary operator cannot communicate directly with LDC 210. Rather, the secondary operator at least partially relies on the cellular network operator's access network and/or core network. RU 230 communicates with DU 125-1, which in turn communicates with CU 120-1. DU 125-1 and CU 120-1 may provide the appropriate processing and management of data needed for RU 230 similar to that provided for RU 130-1. However, by virtue of UE 240 operating as part of a second cellular network slice (as indicated by group 241), which is distinct from the cellular network slice used by the cellular network to service group 141, CU 120-1 routes all cellular network traffic attributed to these UE to LDC 210.

The packet-based communications between RU 230, DU 125-1, and CU 120-1 for UE that operate as part of group 241 that are assigned to a second cellular network slice may be partially encrypted. Data and/or voice information may be encrypted/decrypted by UE 240 and/or may be encrypted/decrypted by RU 230. Neither DU, CU, or any other component of cellular network 110 may be capable of decrypting this information. RU 230 may leave addressing and/or other information besides data payloads unencrypted to allow for routing by cellular network of the encrypted data to LDC 210. LDC 210 and/or NDC 205 may be configured to perform the encryption/decryption. Therefore, data of the secondary operator can remain encrypted while being transmitted and, to some degree, processed by cellular network 110. Arrow 245 represents that data payloads can be transmitted in an encrypted form between RU 230 and LDC 210 without decryption. In other embodiments, data payloads can be transmitted in an encrypted form between LDC 210 and UE 240 as part of a cellular network slice without intervening decryption.

Not only is end-to-end encryption possible between RU 230 (or UE 240) and LDC 210, but the specific radio access technology (RAT) used by RU 230 remains independent of RU 130 and the remainder of cellular network 110. Therefore, the secondary operator could independently use GSM, 3G, 4G LTE, 5G NR, 6G, or some other or future RAT that differs from the RAT which is being used by RU 130-1 and the remainder of cellular network 110.

As illustrated, CU 120-1 communicates with LDC 210. This architecture is shown as an example. One or more connections may additionally or alternatively be presented between NDC 115 and NDC 205, or between DU 125-1 and LDC 210.

The secondary operator may have a dedicated cellular network slice on cellular network 110 such that a defined amount of hardware resources of DUs 125 and CUs 120 and/or communication resources between DUs 125 and CUs 120 are reserved for the secondary operator. When such processing/network resources are not needed, the resources may be released back to cellular network 110 to be used for one or more other cellular network slices. For instance, if the secondary operator is the military, it may only require full use of its cellular network slice occasionally. When not needed, the processing/network resources may be used by the cellular network operator to improve performance for its commercial customers. In some embodiments, a specific instruction or "lease" on the reserved hardware resources of the secondary operator's cellular network slice is required to be received by cellular network 110 from the secondary operator in order to permit use of the resources in conjunction with another cellular network slice.

Additionally or alternatively, spectrum reserved for use by RU 230 may be released by the secondary operator when not needed. This spectrum may be used by RU 130-1 of the cellular network operator for commercial use. NDC 205 or LDC 210 may provide a lease on spectrum to a component of cellular network 110 for spectrum that is not needed by RU 230. (Notably, in another geographic region away from RU 230, the secondary operator may still be using this spectrum.) The cellular network may then be permitted to use this spectrum, such as for up to a time period indicated in the lease. RU 130-1 may send bandwidth part (BWP) definitions to UE 140 that indicates spectrum made available via the lease. In some embodiments, LDC 210 and/or NDC 205 are permitted to reclaim (or cancel the lease) at any time.

In some embodiments, additional cellular network components may be operated by the secondary operator. For example, in addition to RU 230, the secondary operator may maintain its own DU. Communication traffic related to the secondary operator's cellular network slice may be processed using the secondary operator's DU instead of DU 125-1. The secondary operator's DU may remain in communication with CU 120-1 and may still rely on CU 120-1 for interfacing with components of the secondary operator's network. Therefore, for example, if the secondary operator used its own DU, it could rely on the cellular network operator's cellular network for mid-haul and backhaul functions.

While additional components of the secondary operator's network is not illustrated, it should be understood that routing and transmission of communications from UE 240 may extend beyond LDC 210 and/or NDC 205. For instance, communications with a UE of UE 240 may be routed to another UE of the secondary operator that is in communication with LDC 210 or NDC 205 via another CU, DU, or RU. Further, LDC 210 and/or NDC 205 may be connected with public (e.g., the Internet) or private networks with which UE 240 may exchange data.

Figure 3:
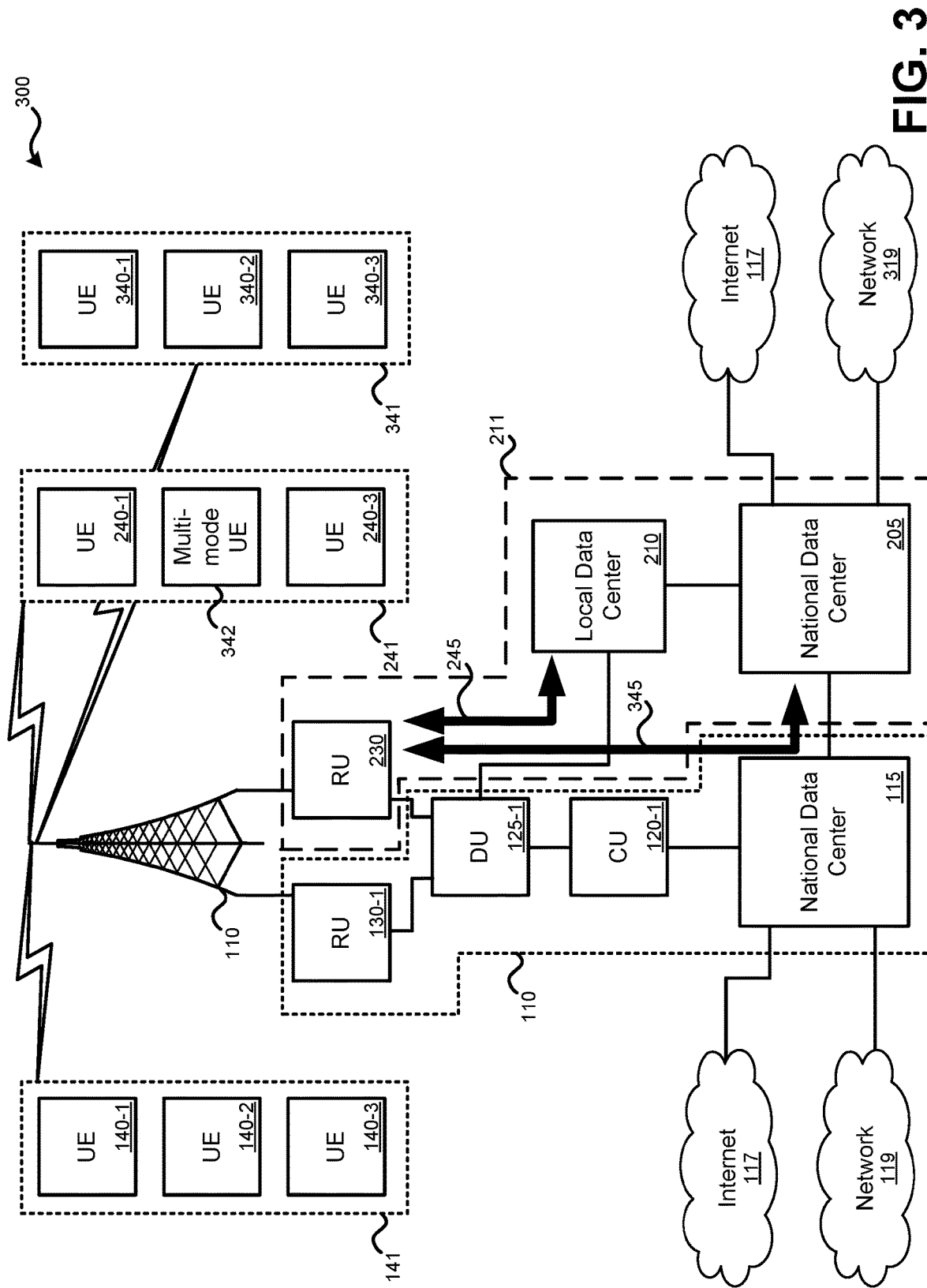
FIG. 3 illustrates a block diagram of another embodiment of a cellular network with advanced secondary operator control.

FIG. 3 illustrates a block diagram of another embodiment of a cellular network 300 with advanced secondary operator control. Cellular network 300 can represent a more detailed embodiment of cellular network 200. On cellular network 300, RU 230, which is operated by the secondary operator, services two cellular network slices. While each of these cellular network slices belongs to the secondary operator, cellular network 110 handles each cellular network slice independently and differently. While group 241 represents that UE 240-1, 240-3, and 342 operate on a first cellular network slice of the secondary operator, group 341 represents that UE 340 operate on a second cellular network slice of the secondary operator. Each of these cellular network slices may be associated with different amounts of bandwidth and processing resources of cellular network 110 (or the slices may be assigned equal shares of the available physical resources).

By virtue of group 241 being on the first cellular network slice of the secondary operator, cellular network 110 routes communications differently. Arrow 245 represents that upstream and downstream communications for the first cellular network slice get routed between RU 230 of the secondary operator and LDC 210 via DU 125-1. In contrast, the second cellular network slice is routed differently: arrow 345 represents that upstream and downstream communications for the second cellular network slice get routed between RU 230 of the secondary operator and NDC 205 via DU 125-1, CU 120-1, and NDC 115. These two possible routes are merely examples of how different cellular network slices of the secondary operator can be routed to different portions of the secondary operator's network via various nodes of the cellular network operated by the cellular network provider.

In addition to being routed differently, other characteristics of the first and second cellular network slices can be managed by the secondary operator differently. Different types of encryption can be used for the first and second cellular network slices. While on one of the cellular network slices encryption/decryption may be handled by the UE, on the other cellular network slice, encryption/decryption may be handled by RU 230.

NDC 205 is illustrated in FIG. 3 as serving as a gateway to network 319 and Internet 117. UE may be assigned to the second cellular network slice on the basis of UE 340 being used to access Internet 117 and/or network 319.

If a UE has the capability to communicate on spectrum used by RU 130-1 and RU 230, the UE may be permitted to switch between using one of the cellular network slices of the secondary operator and a cellular network slice of the cellular network operator. As an example, a UE used by the military may be switched to a cellular network slice of the cellular network operator, such as when being used for non-military purposes or if the cellular network slice of the secondary operator is experiencing high traffic. Further, UE that are capable of communicating using spectrum used by RU 230, RU 130-1, and other RU of the cellular network operator may be able to roam in geographic regions where the secondary operator does not have a RU installed. Therefore, while the UE may use the secondary operator's RUs when available, roaming across the cellular network operator's network may be possible.

Further, while in a particular geographic region, the secondary operator may have spectrum reserved for its use and may have one or more RUs installed that can utilize such spectrum for communication with UE, other factors may necessitate that the spectrum not be used for communication between the UE and RU 230. For example, the secondary operator may operate radar that uses at least some of the spectrum. Contemporaneous use of the spectrum for communication with UE may not be possible due to interference generated by the radar. Therefore, in order to communicate, the UE may switch to communicating with RU 130-1, which uses different spectrum.

Multimode UE 342 represents a UE that can operate on spectrum used by both RU 130-1 and RU 230. In response to a command from a user (e.g., flipping a switch or some other physical actuation, providing a software command), multimode UE 342 may transition from functioning as part of group 241 using the first cellular network slice of the secondary operator to functioning as part of group 141 using a cellular network slice of the cellular network operator. In some embodiments, rather than the user of multimode UE 342 making the change, a command may be received from LDC 210, NDC 205, or some other component of the secondary operator's network. In some embodiments, LDC 210, NDC 205 or some other component of the secondary operator's network may monitor performance of each of the secondary operator's cellular network slices. One or more UE may be transitioned to a cellular network slice of the cellular network provider when a threshold amount of RF spectrum, bandwidth, or processing capabilities of one (or more) of the secondary operator's cellular network slice is being used.

This may involve a command being sent to the UE (e.g., multimode UE 342) that alters characteristics, such as the BWP definition active at the UE. Via the cellular network provider's network, the secondary operator may be able to continue to send commands to the UE, such as a command to transition the UE back to a cellular network slice of the secondary operator. Using such an arrangement, a secondary operator can take advantage of capacity on a cellular network slice of the cellular network operator when needed.

In the illustrated embodiment of FIG. 3, a total of three cellular network slices are presented. It should be understood that, in other embodiments, multiple secondary operators may have cellular network slices, there may be a greater number of cellular network slices, and the cellular network operator and/or a secondary operator may operate a different number of cellular network slices. Further, the particular architecture of the secondary operator's network and/or cellular network 110 may vary. Additionally, the components of cellular network 110 that have communication links with components of secondary operator network 211 can vary.

While various forms of entities may serve as a secondary operator, two particular types of entity may find such an arrangement particularly useful. First, a governmental entity, such as the military, may desire significant autonomy in operating its own virtual cellular network. Security may be of the utmost importance. Operation of its own RUs and having the ability to implement encryption that cannot be decrypted by a commercial operator's cellular network may be particularly useful to a government entity. Another type of entity that may desire significant autonomy is a casino. Casinos require a high level of surveillance to detect cheaters and illicit activity. Implementing cellular-based devices (as opposed to Wi-Fi based devices) may increase security. Further, by operating its own RUs, the casino may be able to further customize and increase security with a decreased potential of a hacker being able to access information via the cellular service provider's cellular network. In such an embodiment, an LDC or NDC of the secondary operator may be located directly on-site at the casino and may be connected with a DU that services one or more RU's of the casino installed in the vicinity. Such arrangements may serve to benefit various other forms of commercial entities that require significant security and/or flexibility in operating a cellular network slice.

Further, as previously detailed, such governmental and non-governmental entities can lease or otherwise release resources (e.g., spectrum, bandwidth, processing capabilities) back to the cellular network operator when not needed. Alternatively, when the cellular network operator detects unused resources on a cellular network slice, the cellular network provider may be permitted to use such resources until they are needed by the secondary operator. Such an arrangement may allow a secondary operator to reserve the capability that is occasionally needed for a peak load, but can allow such resources to be otherwise efficiently used when a peak load is not present.

Figure 4:
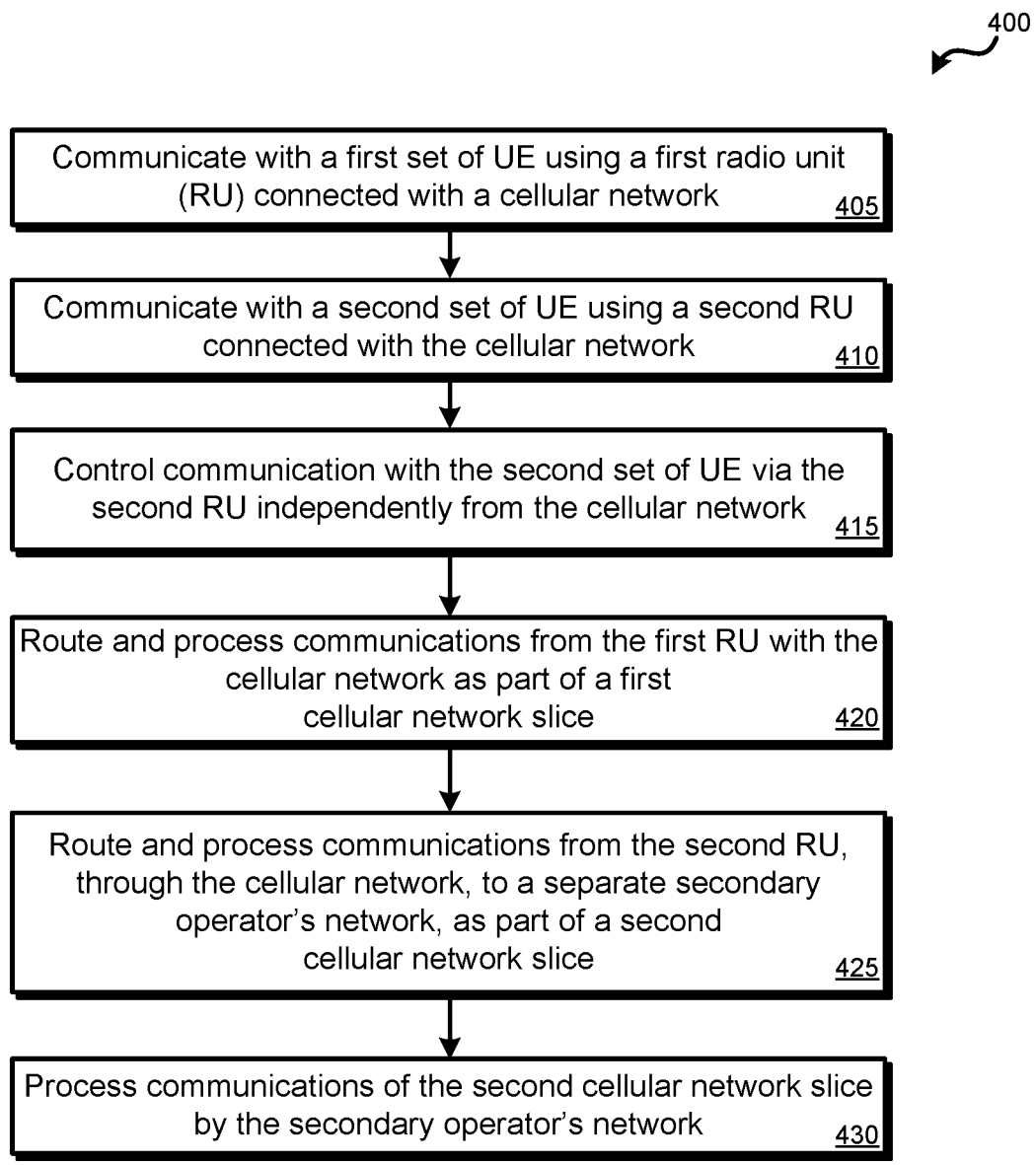
FIG. 4 illustrates an embodiment of a method for operating a cellular network with advanced secondary operator control.

Various methods may be performed using the embodiments of systems detailed in FIGS. 1-3. FIG. 4 illustrates an embodiment of a method 400 for operating a cellular network with advanced secondary operator control. Method 400 may be performed using various embodiments of cellular network 200 or cellular network 300 of FIGS. 2 and 3, respectively. Method 400 can involve both a cellular network operator and a separate and distinct secondary operator that partially relies on the cellular network of the cellular network operator.

At block 405, a first set of one or more UE communicate with a first RU connected with a cellular network. The first RU may be used as the radio interface for a cellular network operator, such as to communicate with UE operated by end user customers of the cellular network operator. The RU can communicate with the UE via one or more antennas, which would typically be attached to a fixed mounting location, such as a building, tower, or bridge. Mobile locations for the RU and/or antenna may also be possible, such as a vehicle trailer, UAV, or some other location intended to provide temporary service to a geographic region.

At block 410, a second set of one or more UE communicate with a second RU connected with a cellular network. The second RU may be used as the radio interface for UE of a secondary operator. This second RU may be owned, maintained, and/or operated by the secondary operator. The RU can communicate with the UE of the secondary operator via one or more antennas, which may be the same or different from the antenna of block 405. The second RU can be co-located with the first RU, such as housed together at a base station or attached with a same tower. The second RU of block 410 may operate using a same or different RAT than the first RU. The second RU may operate using a different frequency spectrum, an overlapping frequency spectrum, or the same frequency spectrum as the first RU. If overlapping or the same, only one of the RUs may use a particular portion of frequency spectrum at a given time to avoid interference.

At block 415, communication with the second set of UE may be controlled based on parameters and/or characteristics set by the secondary operator via the secondary operator's network. The secondary operator's network may update these parameters and characteristics by communicating with the second RU and UE through one or more components of the cellular network provider's cellular network. Therefore, while the secondary operator operates its own secondary network and the second RU, the secondary operator relies on one or more components of a cellular network provider's cellular network for cellular network services and/or communication between the secondary network and the second RU. Parameters and characteristics that can be controlled include: the method of authentication for UE; which UE are authenticated; the priority of each UE; the amount of bandwidth provided to each UE; the encryption used by each UE; the cellular services provided to each UE (e.g., SMS, MMS, data services, voice services, voicemail, etc.); which cellular network slice the UE is assigned to (if the secondary operator operates multiple cellular network slices); and the BWP active at each UE. The allocation of resources to support the UE can be dynamically optimized to support the required service level for each application supported by the network and the UE. The policy management, enforcement, traffic shaping, packet loss, jitter, handover performance, latency, temporal and spatial service objectives can each be considered in the provisioning and control of the communication to and from the UE. As part of block 415, the second RU may perform encryption and decryption of communications from UE and to UE, respectively.

At block 420, on a first cellular network slice, communications with the first set of UE are performed between the cellular network and the first set of UE using the first RU. None of these communications may be performed using any of the components specific to the secondary operator, such as the second RU or the secondary operator's network. The network operator of the cellular network controls the parameters and characteristics set at the UE and the first RU. Similar to the secondary operator, the network operator can control: the priority of each UE of the first set; the amount of bandwidth provided to each UE; the encryption used by each UE of the first set (if any); the cellular services provided to each UE of the first set; which cellular network slice the UE is assigned to (if the secondary operator operates multiple cellular network slices); and the BWP active at each UE of the first set.

At block 425, communications between the second set of UE on the second cellular network slice of the secondary operator are routed between the second RU and the secondary operator's network via the cellular network. Therefore, at least one component of the cellular network provider's access and/or core network, such as a DU, CU, and/or NDC, is used to process and/or route communication traffic between the second RU and the secondary operator's network. This communication traffic, except for a portion of the data necessary for addressing (e.g., packet headers), may remain encrypted while on the cellular network of the cellular network provider. As an example, the second RU may communicate with a DU of the cellular network, which communicates with an LDC of the secondary operator. As another example, the second RU may communicate with a DU that is also operated by the secondary operator. The DU of the secondary operator may communicate with a CU of the cellular network, which communicates with an LDC or NDC of the secondary operator. The cellular network operator and the cellular network may be incapable of decrypting such data. Rather, encryption/decryption is handled by a component of the secondary operator's network and either the second RU or the UE of the second set.

At block 430, the secondary operator's network may process the communications between the second set of UE handled by the second RU appropriately. Such processing can involve serving as a gateway with a network (e.g., the Internet, a private network) with which the UE is attempting to communicate, providing communication services (e.g., phone calls, texts) to some other UE or device, etc. From the perspective of the cellular network, the precise services being provided by the secondary operator's network to the second set of UE may not be possible to determine, especially if the communication traffic is encrypted. From the perspective of the cellular network, the bandwidth and processing resources may be physically limited in accordance with the second cellular network slice; otherwise, the characteristics of the communication traffic may be unknown.

Figure 5:
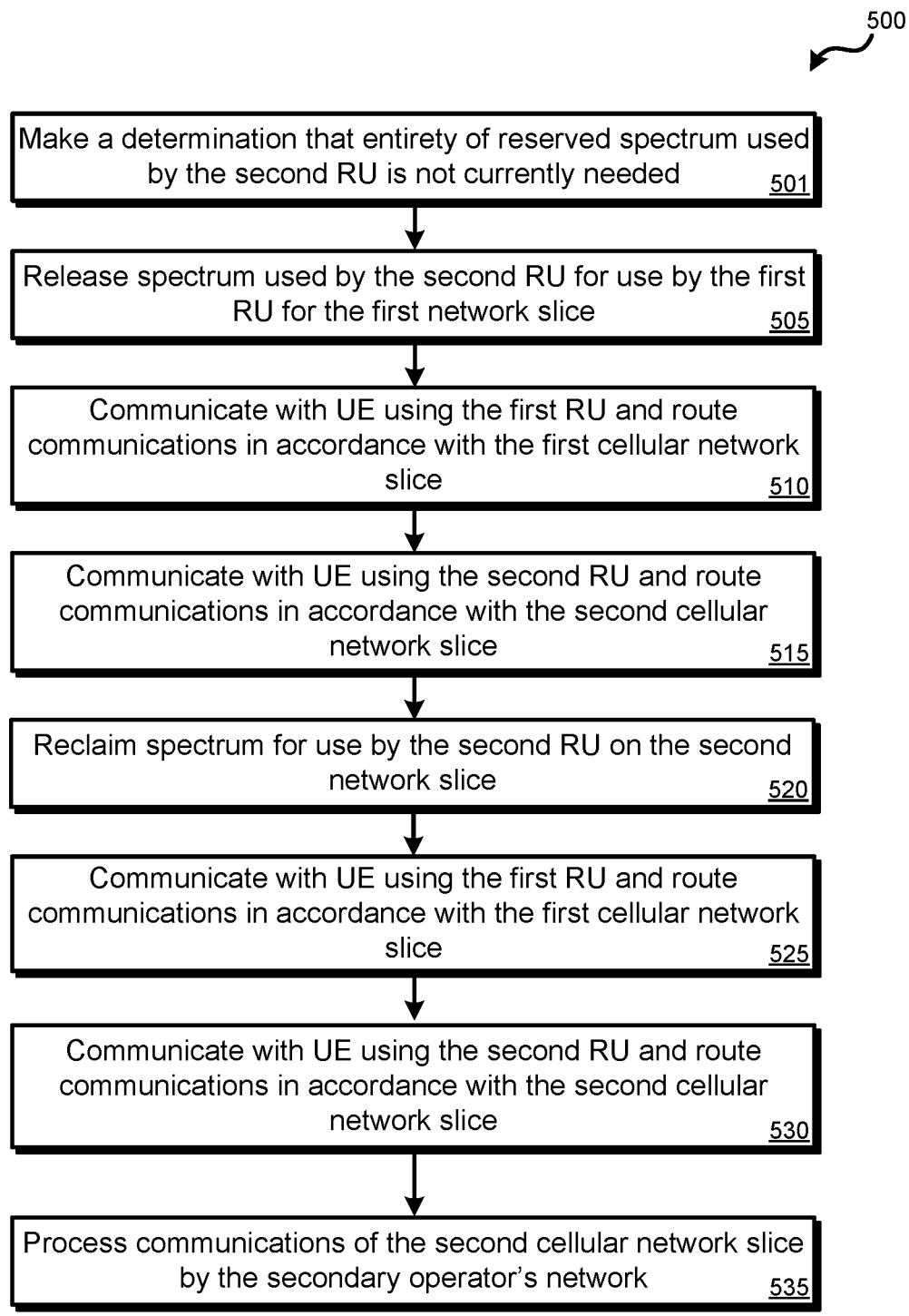
FIG. 5 illustrates an embodiment of a method for operating a cellular network using dynamic secondary spectrum sharing.

FIG. 5 illustrates an embodiment of a method 500 for operating a cellular network using dynamic spectrum sharing between a secondary operator and a cellular network operator. Method 500 may be performed using various embodiments of cellular network 200 or cellular network 300 of FIGS. 2 and 3, respectively. While method 500 is focused on the release and reclamation of spectrum resources, additionally or alternatively, method 500 can be applied to access network and/or core network resources reserved based on cellular network slice, such as front-haul, mid-haul, and/or back-haul bandwidth, and/or processing resources at various components of the cellular network. Further, while method 500 is focused on a secondary operator releasing resources for temporary use by a cellular network operator, in other embodiments the secondary operator may release resources that can be used by another secondary operator (e.g., one governmental entity may release resources to be used by another governmental entity). Method 500 can involve both a cellular network operator and a separate and distinct secondary operator that partially relies on the cellular network of the cellular network operator.

At block 501, a determination may be made, such as by a component of the secondary operator's network (or by an authorized user of the secondary operator's network) that indicates spectrum that is not currently needed. This determination may be performed by an RU of the secondary provider or some higher-level component based on the amount of radio resources (e.g. resource blocks) used as compared to a threshold over time. For example, if less than 50% of the available radio resources are unused for a defined period of time, a percentage of those available radio resources may be released.

At block 505, spectrum may be released by the secondary operator's network. Block 505 can include the secondary operator's network activating or defining new BWP definitions such that UE of the secondary operator do not use the spectrum that is to be released. A command may be sent to the cellular network operator that the spectrum is available in a particular geographic region, such as for at least a defined period of time. It should be noted that the secondary operator may continue to use the spectrum via other RUs in other geographic regions. For instance, spectrum may only be released along the east coast of Florida, but may be retained by the secondary operator for use by RUs on Florida's Gulf Coast. Only spectrum that can be utilized by UE and/or an RU of the cellular service provider may be released.

At block 510, a first RU of the cellular network operator may use the released spectrum to communicate with UE that are managed by the cellular network operator. Block 510 can involve updated BWP definitions being sent to and/or activated by the UEs of the cellular network operator such that the spectrum released by the secondary operator at block 505 can be used. Further detail of how communications performed with the first RU may be routed are provided in relation to block 525. At block 515, a second RU of the secondary operator may use its retained spectrum to communicate with UE that are managed by the secondary operator. Previously, or as part of block 515, updated BWP definitions are sent to and/or activated by the UEs of the secondary operator such that the spectrum released by the secondary operator is not attempted to be used. Further detail of how communications performed with the second RU may be routed are provided in relation to block 530.

At block 520, spectrum that was released or leased at block 505 may be reclaimed or the lease may not be renewed. Block 520 may be performed based on a step similar to block 501 being performed in which the determination reaches the opposite conclusion in that some amount of reserved spectrum is now needed. Again here, the determination could be based on a comparison to a threshold over time. For instance, if more than 75% of the available spectrum of the second RU is used on average for over a defined period of time, spectrum that was previously released may be reclaimed (or a lease may not be renewed). As part of block 520, the cellular network operator may send new or activate different BWP definitions at its UE so that the bandwidth is no longer used. The secondary operator, via its RU, may send new or activate different BWP definitions at its UE so that the reclaimed spectrum begins being used.

At block 525, on a first cellular network slice, communications with the first set of UE are performed between the cellular network and the first set of UE using the first RU. None of these communications may be performed using any of the components specific to the secondary operator, such as the second RU or the secondary operator's network. The network operator of the cellular network controls the parameters and characteristics set at the UE and the first RU. Similar to the secondary operator, the network operator can control: the priority of each UE of the first set; the amount of bandwidth provided to each UE; the encryption used by each UE of the first set (if any); the cellular services provided to each UE of the first set; which cellular network slice the UE is assigned to (if the secondary operator operates multiple cellular network slices); and the BWP active at each UE of the first set.

At block 530, communications between the second set of UE on the second cellular network slice of the secondary operator are routed between the second RU and the secondary operator's network via the access network and/or core network. Therefore, at least one component of the cellular network provider's cellular access network and/or cellular core network, such as a DU, CU, and/or NDC, is used to process and/or route communication traffic between the second RU and the secondary operator's network. This communication traffic, except for a portion of the data necessary for addressing (e.g., packet headers), may remain encrypted while on the cellular network of the cellular network provider. As an example, the second RU may communicate with a DU of the cellular network, which communicates with an LDC of the secondary operator. As another example, the second RU may communicate with a DU that is also operated by the secondary operator. The DU of the secondary operator may communicate with a CU of the cellular network, which communicates with an LDC or NDC of the secondary operator. The cellular network operator and the cellular network may be incapable of decrypting such data. Rather, encryption/decryption is handled by a component of the secondary operator's network and either the second RU or the UE of the second set.

At block 535, the secondary operator's network may process the communications between the second set of UE handled by the second RU appropriately. Such processing can involve serving as a gateway with a network (e.g., the Internet, a private network) with which the UE is attempting to communicate, providing communication services (e.g., phone calls, texts) to some other UE or device, etc. From the perspective of the cellular network, the precise services being provided by the secondary operator's network to the second set of UE may not be possible to determine, especially if the communication traffic is encrypted. From the perspective of the cellular network, the bandwidth and processing resources may be physically limited in accordance with the second cellular network slice; otherwise, the characteristics of the communication traffic may be unknown.

Figure 6:
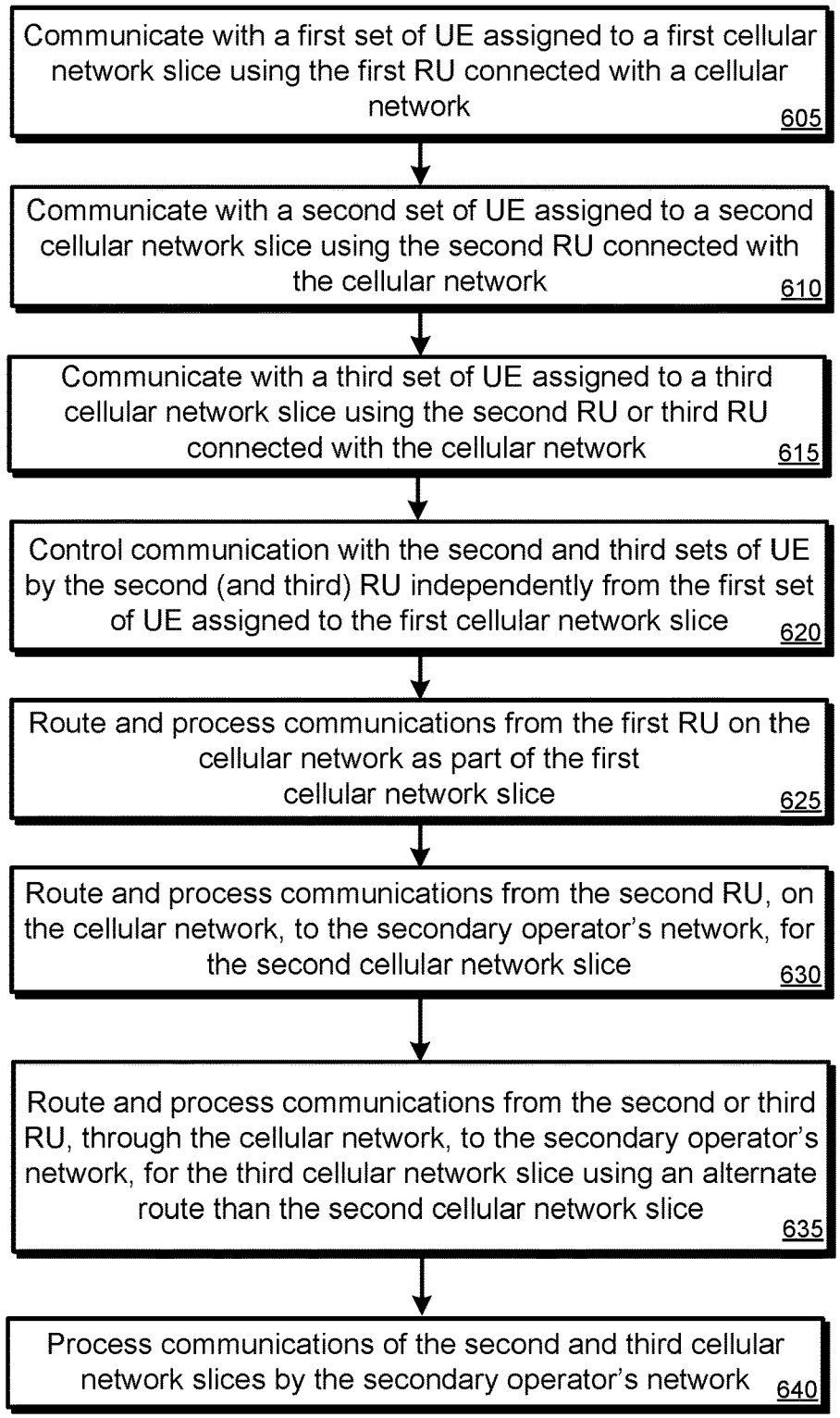
FIG. 6 illustrates an embodiment of a method for operating a cellular network with advanced secondary operator control on multiple cellular network slices.

FIG. 6 illustrates an embodiment of a method 600 for operating a cellular network with advanced secondary operator control on multiple cellular network slices. Method 600 may be performed using various embodiments of cellular network 300 of FIG. 3.

At block 605, a first set of one or more UE communicate with a first RU connected with a cellular network of a cellular network. The first RU may be used as the radio interface for a cellular network operator, such as to communicate with UE operated by end user customers of the cellular network operator. The RU can communicate with the UE via one or more antennas, which would typically be attached to a fixed mounting location, such as a building, tower, or bridge. Mobile locations for the RU and/or antenna may also be possible, such as a vehicle trailer, UAV, or some other location intended to provide temporary service to a geographic region.

At block 610, a second set of one or more UE communicates with a second RU connected with a cellular network. The second RU may be used as the radio interface for UE of a secondary operator. The RU can communicate with the UE of the secondary operator via one or more antennas, which may be the same or different from the antenna of block 605. The second RU can be co-located with the first RU, such as housed together at a base station or attached with a same tower. The second RU of block 610 may operate using a same or different RAT than the first RU. The second RU may operate using a different frequency spectrum, an overlapping frequency spectrum, or the same frequency spectrum as the first RU. If overlapping or the same, only one of the RUs may use a particular portion of frequency spectrum at a given time to avoid interference.

At block 615, a third set of one or more UE communicates with the second RU or a third RU connected with a cellular network. If present, the third RU may be used as the radio interface for some UE of the secondary operator in addition to the second RU. The second RU and/or third RU can communicate with additional UE (the third set) of the secondary operator via one or more antennas, which may be the same or different from the antenna of block 605 and block 610. The third RU, if present, can be co-located with the first and second RU, such as housed together at a base station or attached with a same tower. The third RU of block 615 may operate using a same or different RAT than the first RU and/or second RU. The third RU may operate using a different frequency spectrum, an overlapping frequency spectrum, or the same frequency spectrum as the second RU and/or third RU.

At block 620, communication with the second set of UE and third set of UE may be controlled based on parameters and characteristics set by the secondary operator via the secondary operator's network. The parameters and characteristics set for the second and third sets of UE can vary per cellular network slice. The secondary operator's network may update these parameters and characteristics by communicating with the second RU (and third RU, if present) and UE through one or more components of the cellular network provider's cellular network. Therefore, while the secondary operator operates its own secondary network and one or more RUs, the secondary operator relies on one or more components of the cellular network provider's cellular network for cellular network services and/or communication between the secondary network and the second and, possibly, third RU. Parameters and characteristics that can be controlled include: the priority of each UE; the amount of bandwidth provided to each UE; the encryption used by each UE; the cellular services provided to each UE; which cellular network slice the UE is assigned to (if the secondary operator operates multiple cellular network slices); and the BWP active at each UE.

At block 625, on the first cellular network slice, communications with the first set of UE are performed between the cellular network and the first RU for the first set of UE. None of these communications may be performed using any of the components specific to the secondary operator, such as the second RU, third RU, or the secondary operator's network. The network operator of the cellular network controls the parameters and characteristics set at the UE and the first RU. Similar to the secondary operator, the network operator can control: the priority of each UE of the first set; the amount of bandwidth provided to each UE; the encryption used by each UE of the first set (if any); the cellular services provided to each UE of the first set; which cellular network slice the UE is assigned to (if the secondary operator operates multiple cellular network slices); and the BWP active at each UE of the first set.

At block 630, communications between the second set of UE of the secondary operator are routed between the second RU and the secondary operator's network via the cellular network as part of the second cellular network slice. Therefore, at least one component of the cellular network provider's access network and/or core network, such as a DU, CU, and/or NDC, is used to process and/or route communication traffic between the second RU and the secondary operator's network. This communication traffic, except for a portion of the data necessary for addressing (e.g., packet headers), may remain encrypted while on the cellular network of the cellular network provider. The cellular network operator and the cellular network may be incapable of decrypting such data. Rather, encryption/decryption is handled by a component of the secondary operator's network and either the second RU or the UE of the second set.

At block 635, communications between the third set of UE of the secondary operator are routed between the second (or third) RU and the secondary operator's network via the access network and/or cellular core network as part of the third cellular network slice. At least one aspect of the communication traffic of the third cellular network slice may be handled differently than the second cellular network slice. In some embodiments, the routing between the cellular network and the secondary operator's network varies, such as the differences indicated by arrows 245 and 345. Additional or alternatively, other parameters or characteristics may vary, such as the total amount of bandwidth or processing resources of the slices, the available cellular services, the type of encryption used (if any), etc. Additionally or alternatively, the third slice may serve a purpose other than different routing. For example, the third slice could be used as a test environment for different security functionality.

At block 640, the secondary operator's network may receive and process the communications between the second and third sets of UE handled by the second (and, if present, third) RU appropriately. Such processing can involve serving as a gateway with a network (e.g., the Internet, a private network) with which the UE is attempting to communicate, providing communication services (e.g., phone calls, texts) to some other UE or device, etc. From the perspective of the cellular network, the precise services being provided by the secondary operator's network to the second set of UE may not be possible to determine, especially if the communication traffic is encrypted. From the perspective of the cellular network, the bandwidth and processing resources may be physically limited in accordance with the allocation of the second and third cellular network slices; otherwise, the characteristics of the communication traffic may be unknown.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cellular network system with advanced secondary operator privacy, the cellular network system comprising:
   a first radio unit that communicates with a first plurality of user equipment using a first radio spectrum, wherein:
      first communications between the first radio unit and a cellular network are performed using a first cellular network slice; and
      the first radio unit is operated by a cellular network operator;
   a second radio unit that communicates with a second plurality of user equipment using a second radio spectrum, wherein:
      the second radio unit is operated by a secondary operator distinct from the cellular network operator;
      second communications between the second radio unit and the cellular network are performed using a second cellular network slice; and
      the second communications are encrypted such that the cellular network cannot decrypt the second communications;
   a distributed unit (DU) of the cellular network that is in communication with the first radio unit and the second radio unit, wherein the DU is operated by the cellular network operator; and
   a first national data center (NDC) of the cellular network that is in communication with the DU, wherein:
      the first NDC processes the first communications performed using the first cellular network slice; and
      a second NDC, operated by the secondary operator distinct from the cellular network operator, processes the encrypted second communications performed using the second cellular network slice.

2. The cellular network system with advanced secondary operator privacy of claim 1, wherein the first NDC routes the encrypted second communications to the second NDC operated by the secondary operator distinct from the cellular network operator.

3. The cellular network system with advanced secondary operator privacy of claim 1, wherein the cellular network system further comprises the second NDC operated by the secondary operator distinct from the cellular network operator.

4. The cellular network system with advanced secondary operator privacy of claim 1, further comprising:
   a centralized unit (CU) of the cellular network, the CU in communication with the DU, wherein the DU routes the first communications and the encrypted second communications to the CU.

5. The cellular network system with advanced secondary operator privacy of claim 4, wherein the CU routes the first communications and the encrypted second communications to the first NDC.

6. The cellular network system with advanced secondary operator privacy of claim 4, wherein the CU routes the encrypted second communications to the second NDC.

7. The cellular network system with advanced secondary operator privacy of claim 1, wherein the encrypted second communications are routed by the DU to a local data center operated by the secondary operator.

8. The cellular network with advanced secondary operator privacy of claim 7, wherein the local data center routes the second communications to the second NDC.

9. The cellular network system with advanced secondary operator privacy of claim 1, wherein the second radio unit further sends third communications between the second radio unit and the cellular network as part of a third cellular network slice.

10. The cellular network system with advanced secondary operator privacy of claim 9, wherein the cellular network routes the encrypted second communications and the third communications to separate components of a same network that is distinct from the cellular network and operated by the secondary operator.

11. The cellular network system with the advanced secondary operator privacy of claim 1, wherein the first radio unit uses a different cellular network radio access technology (RAT) for communication with the first plurality of user equipment than the second radio unit with the second plurality of user equipment.

12. The cellular network system with the advanced secondary operator privacy of claim 1, wherein the cellular network comprises a 5G New Radio (NR) cellular core network.

13. The cellular network system with the advanced secondary operator privacy of claim 1, further comprising user equipment of the second plurality of user equipment, wherein user equipment of the second plurality of user equipment is configured to be switched between communicating with the first radio unit and the second radio unit based on a command.

14. A method for operating a cellular network system with advanced secondary operator privacy, the method comprising:

communicating with a first set of user equipment using a first radio unit and a first radio spectrum, wherein:
first communications between the first radio unit and a cellular network are performed as part of a first cellular network slice; and
the first radio unit is operated by a cellular network operator;

communicating with a second set of user equipment using a second radio unit and a second radio spectrum, wherein:
the second radio unit is operated by a secondary operator distinct from the cellular network operator;
second communications between the second radio unit and the cellular network are performed as part of a second cellular network slice;
the second communications are encrypted such that the cellular network cannot decrypt the second communications;
routing, by a distributed unit (DU), the first communications to a first national data center (NDC) of the cellular network; and routing the encrypted second communications of the second cellular network slice to a second NDC operated by the secondary operator, wherein the second NDC is separate from the cellular network.

15. The method of claim 14, wherein the second NDC decrypts the encrypted second communications.

16. The method of claim 14, further comprising:
routing, by the first NDC, the encrypted second communications to the second NDC operated by the secondary operator distinct from the cellular network operator.

17. The method of claim 14, further comprising:
routing, by the DU, the first communications and the encrypted second communications to a centralized unit (CU) of the cellular network.

18. The method of claim 17, further comprising:
routing, by the CU, the first communications and the encrypted second communications to the first NDC.

19. The method of claim 17, further comprising:
routing, by the CU, the first communications to the first NDC; and
routing, by the CU, the encrypted second communications to the second NDC.

20. The method of claim 17, further comprising:
routing, by the DU, the encrypted second communications to a local data center operated by the secondary operator.

* * * * *